(12) United States Patent
Kawasumi et al.

(10) Patent No.: US 7,631,713 B2
(45) Date of Patent: Dec. 15, 2009

(54) METHOD FOR DRIVING HYDROGEN INTERNAL COMBUSTION ENGINE CAR

(75) Inventors: Shinroku Kawasumi, 5-13-20, Inamuragasaki, Kamakura-shi, Kanagawa, 248-0024 (JP); Sunao Sugihara, Kanagawa (JP)

(73) Assignee: Shinroku Kawasumi, Kamakura-shi, Kanawaga (JP)

( * ) Notice: Subject to any disclaimer, the term of this patent is extended or adjusted under 35 U.S.C. 154(b) by 359 days.

(21) Appl. No.: 11/660,353

(22) PCT Filed: Aug. 12, 2005

(86) PCT No.: PCT/JP2005/014851

§ 371 (c)(1), (2), (4) Date: Feb. 16, 2007

(87) PCT Pub. No.: WO2006/019061

PCT Pub. Date: Feb. 23, 2006

(65) Prior Publication Data

US 2007/0284168 A1 Dec. 13, 2007

(30) Foreign Application Priority Data

Aug. 19, 2004 (JP) .............................. 2004-239989

(51) Int. Cl.
*B60K 15/10* (2006.01)
*B60K 15/00* (2006.01)
*H01M 8/00* (2006.01)
*B60P 3/22* (2006.01)

(52) U.S. Cl. ........................ 180/69.5; 180/69.4; 429/12; 280/830; 123/DIG. 12

(58) Field of Classification Search ................ 180/69.4, 180/69.5; 429/12; 280/830; 123/DIG. 12
See application file for complete search history.

(56) References Cited

U.S. PATENT DOCUMENTS

| | | | | |
|---|---|---|---|---|
| 3,673,801 A * | 7/1972 | Goldberger | .................. | 60/218 |
| 4,111,160 A * | 9/1978 | Talenti | ...................... | 123/1 A |
| 4,182,278 A * | 1/1980 | Coakwell | .................... | 123/1 A |
| 4,344,831 A * | 8/1982 | Weber | ...................... | 204/228.5 |
| 6,250,078 B1 * | 6/2001 | Amendola et al. | ........... | 60/509 |
| 6,439,334 B1 * | 8/2002 | Myers et al. | ................ | 180/314 |
| 7,191,737 B2 * | 3/2007 | Klein | ............................ | 123/3 |
| 7,350,604 B2 * | 4/2008 | Veenstra et al. | ............ | 180/69.4 |
| 7,478,619 B2 * | 1/2009 | Patrono | ...................... | 123/241 |

FOREIGN PATENT DOCUMENTS

JP 2002-039022 2/2002
JP 2003-040602 2/2003

OTHER PUBLICATIONS

International Search Report, PCT/JP2005/014851, Dated Nov. 15, 2005.

* cited by examiner

*Primary Examiner*—Paul N Dickson
*Assistant Examiner*—John R Olszewski
(74) *Attorney, Agent, or Firm*—Nixon & Peabody LLP; Jeffrey L. Costellia

(57) ABSTRACT

A car mounted with a hydrogen internal combustion engine is driven by supplying hydrogen gas fuel which is produced by vaporizing an aqueous hydrazine solution carried on the car and bringing the vaporized hydrazine into contact with a catalyst carried on the car to decompose hydrazine.

8 Claims, 1 Drawing Sheet

FIGURE
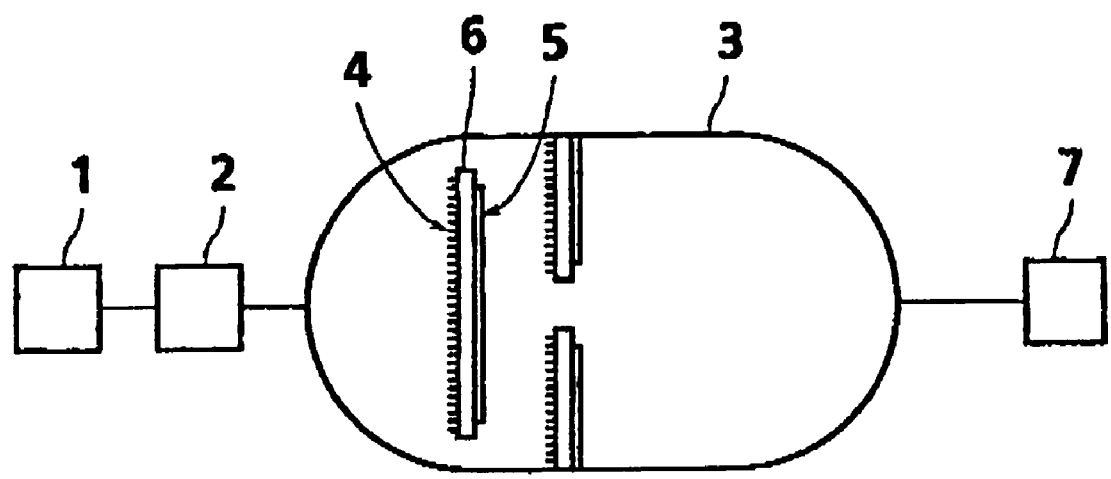

METHOD FOR DRIVING HYDROGEN INTERNAL COMBUSTION ENGINE CAR

FIELD OF THE INVENTION

The present invention relates to a method for supplying hydrogen fuel to a motor car mounted an internal hydrogen combustion engine. The invention further relates to an apparatus for supplying hydrogen fuel to the internal engine.

BACKGROUND OF THE INVENTION

Most motor cars are driven utilizing combustion energy provided by burning hydrocarbon fuel such as gasoline or diesel fuel in an internal combustion engine. However, in consideration of environmental pollution and breakage of an ozone layer caused by carbon dioxide which is produced by combustion of hydrocarbon fuel, new motor car-driving systems which do not utilize combustion of hydrocarbon fuel have been-studied.

Hydrogen has been-paid attention as a particularly clear energy source. A fuel cell motor car which is driven utilizing energy produced by combining hydrogen and oxygen has been practically employed. The hydrogen is generally charged in a pressure-resistant vessel which is mounted on the motor car. The fuel cell, however, has disadvantageous features in-that it needs very high cost for production and it has a large weight and a large volume. The large weight and large volume of the fuel cell is not favorably accepted for automobiles which are required to reduce their weight and volume as much as possible. Further, there is a problem in that the pressure-resistant vessel containing hydrogen gas under high pressure mounted onto a car may be dangerous. Furthermore there is another problem in that the pressure-resistant vessel is large in its weight and volume. Therefore, it will need a long period of time for motor cars mounted with a hydrogen fuel cell to be widely employed. "Electric Cell Handbook, New Edition" (published by Maruzen Inc., Feb. 20, 1995) describes fuel cells which utilize hydrogen-containing compounds such as methanol and hydrazine as fuel sources. It is also described that there are various problems in their practical use.

"Chemistry", Vol. 54, No. 6 (1999), pages 41-42, describes an internal hydrogen combustion engine car (motor car driven by burning hydrogen directly in an internal combustion engine). This publication further describes that the internal hydrogen combustion engine motor car have been under development for practical use. This publication furthermore describes that hydrogen fuel can be charged into a pressure-resistant vessel or hydrogen fuel can be supplied from methanol carried an the motor car.

JP 2002-180906 describes a system for the internal hydrogen combustion engine for a motor car which comprises decomposing a hydrogen-containing compound such as methanol, gasoline, liquid petroleum gas or compressed natural gas carried on a motor car by means of a reformer carried on the motor car to produce-hydrogen gas, compressing the hydrogen gas in a storage tank, and burning the stored hydrogen gas for driving the car.

SUMARY OF THE INVENTION

The present invention has an object to provide a novel method for supplying hydrogen gas fuel to be used in an internal hydrogen combustion engine.

As a result of study by the inventors, the problems attached to the conventional-internal hydrogen combustion engine car can be solved by using a hydrogen gas which is produced by vaporizing an aqueous hydrazine solution carried on a motor car and bringing the vaporized aqueous hydrazine into contact with a catalyst.

Accordingly, the present invention resides in a method for driving a motor car mounted with an internal hydrogen combustion engine by supplying hydrogen gas fuel to the engine, wherein the motor car carries an aqueous hydrazine solution and a catalyst, and the aqueous hydrazine solution is vaporized and brought into contact with the catalyst to decompose hydrazine, whereby producing the hydrogen gas fuel.

The invention further resides in an internal hydrogen combustion engine car mounted with an aqueous hydrazine solution, an apparatus of vaporizing an aqueous hydrazine solution, catalyst means containing a catalyst decomposing vaporized hydrazine, and an internal hydrogen combustion engine.

EFFECTS OF THE INVENTION

The method for driving an internal hydrogen combustion motor car is advantageous in the following features:

(1) the internal hydrogen combustion motor car is advantageous in practice in comparison with a hydrogen fuel cell motor car which requires prominently high costs;

(2) safety is enhanced because there is no need of carrying a hydrogen-gas charged pressure-resistant vessel (which should be paid very careful care) on a motor car; and the motor car has increased space for cargo.

(3) there is no need of installing hydrogen gas-supplying stations.

BRIEF DESCRIPTION OF THE DRAWINGS

FIGURE is a schematic view which illustrates an apparatus for producing hydrogen gas from an aqueous hydrogen gas solution according to the invention. The apparatus are mounted onto a motor car.

1: aqueous hydrazine solution tank
2: spray means
3: catalyst means (hydrazine decomposing apparatus)
4: catalyst
5: heating means
6: substrate
7: internal hydrogen combustion engine

DETAILED DESCRIPTION OF THE INVENTION

Preferred embodiments of the method for driving a motor car mounted with (or equipped with) an internal hydrogen combustion engine according to the invention are set forth below:

(1) the aqueous hydrazine solution is processed to reduce its water content prior to the contact with the catalyst;

(2) the contact of hydrazine with the catalyst is performed under heating;

(3) the catalyst contains aluminum, platinum, palladium or tungsten.

Preferred embodiments of the motor car mounted with an internal hydrogen combustion engine according to the invention are set forth below:

(1) the motor car has an apparatus of reducing a water content in an aqueous hydrazine solution;

(2) the catalyst means is equipped with a catalyst-heating means;

(3) the catalyst contains aluminum, platinum, palladium or tungsten.

The internal hydrogen combustion engine motor car and the method of driving the motor car are further described below.

Hydrogen gas is produced from hydrazine under the below-given reaction in the hydrogen-supplying system of the invention:

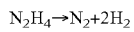

Hydrazine is generally present as monohydrate in an aqueous hydrazine solution. Therefore, the reaction can be described as follows:

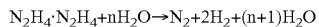

The aqueous hydrazine solution can have an optional hydrazine concentration. It is suitable, however, that an aqueous hydrazine solution has a high hydrazine concentration (such as not lower than 60 weight %, more suitably not lower than 80 weight %), in consideration of energy generating efficiency. If an aqueous hydrazine solution having a low hydrazine concentration is employed, the water content in the aqueous hydrazine solution is suitably reduced by an appropriate dehydrating means prior to the contact with the catalyst so as to increase decomposition efficiency.

The apparatus for obtaining hydrogen gas from the aqueous hydrazine solution which is employed in the invention is explained below with reference to the attached drawing.

FIGURE is a schematic view which illustrates an apparatus for producing hydrogen gas from an aqueous hydrazine solution according to the invention. The apparatus are mounted onto a motor car.

In FIGURE, an aqueous hydrazine solution is stored in an aqueous hydrazine solution storage tank 1. The aqueous hydrazine solution is heated by electric energy supplied by a battery mounted onto the motor car when the engine is started or by thermal energy supplied by the engine after the engine is started, and then sprayed and vaporized by a spray means 2. If the aqueous hydrazine solution has a low hydrazine concentration, the hydrazine solution is suitably processed to decrease the water content (that is, dehydrating) prior to the spraying.

The resulting vapor of a mixture of water and hydrazine is then brought into contact with a catalyst apparatus (i.e., hydrazine decomposing apparatus) 3. In the catalyst apparatus 3, a number of metallic or ceramic substrates 6 on one surface of which is carried a catalyst 4 are fixed. The vaporized hydrazine is brought into contact with the catalyst 4 which is suitably heated to a temperature of not lower than 100° C., more suitably not lower than 150° C. so that the catalyst can be activated and dehydrated. The hydrazine then decomposes according to the aforementioned reaction system, to produce a mixture of hydrogen gas and nitrogen gas. The gaseous mixture contains water supplied by the aqueous solution and aqueous vapor released from hydrazine hydrate (hydrazine monohydrate).

There are no specific limitations with respect to the hydrazine-decomposing catalysts. Suitably employed catalysts comprises aluminum, platinum, palladium, tungsten, nickel, copper, or manganese dioxide.

The gaseous mixture comprising hydrogen gas, nitrogen gas and vapor produced in the catalyst apparatus can be directly supplied to an internal hydrogen combustion engine 7 and burned under reaction with separately supplied oxygen. If appropriate, the gaseous mixture can be subjected to separation of nitrogen gas and/or vapor. Otherwise, vapor can be supplemented to the mixture. The gaseous mixture can be once stored in hydrogen storage bomb and then supplied to the internal hydrogen combustion engine.

What is claimed is:

1. A method for driving a motor car mounted with an internal hydrogen combustion engine by supplying hydrogen gas fuel to the engine, wherein the motor car carries an aqueous hydrazine solution and a catalyst, and the aqueous hydrazine solution is vaporized and brought into contact with the catalyst to decompose hydrazine, whereby producing the hydrogen gas fuel.

2. The method of claim 1, wherein the aqueous hydrazine solution is processed to reduce its water content prior to the contact with the catalyst.

3. The method of claim 1, wherein the contact of hydrazine with the catalyst is performed under heating.

4. The method of claim 1, wherein the catalyst contains aluminum, platinum, palladium or tungsten.

5. An internal hydrogen combustion engine car mounted with an aqueous hydrazine solution, an apparatus of vaporizing an aqueous hydrazine solution, catalyst means containing a catalyst decomposing vaporized hydrazine, and an internal hydrogen combustion engine.

6. The internal hydrogen combustion engine motor car of claim 5, which comprises an apparatus of reducing a water content in an aqueous hydrazine solution.

7. The internal-hydrogen combustion engine motor car of claim 5, wherein the catalyst means is equipped with a catalyst-heating means.

8. The internal hydrogen combustion engine motor car of claim 5, wherein the catalyst contains aluminum, platinum, palladium or tungsten.

* * * * *